United States Patent [19]

Daly

[11] Patent Number: 4,514,097

[45] Date of Patent: Apr. 30, 1985

[54] FRICTION BEARING ASSEMBLY HAVING A SERIES OF RINGS CONSTITUTING A BUSHING THEREFOR

[75] Inventor: Jeffery E. Daly, Houston, Tex.

[73] Assignee: Reed Rock Bit Company, Houston, Tex.

[21] Appl. No.: 421,213

[22] Filed: Sep. 22, 1982

[51] Int. Cl.³ .............................................. F16C 33/26
[52] U.S. Cl. ....................................... 384/93; 384/95; 384/273; 384/292; 308/DIG. 4
[58] Field of Search ............... 384/291, 292, 273, 276, 384/302, 301, 373, 93, 95; 308/DIG. 4; 175/371

[56] References Cited

U.S. PATENT DOCUMENTS

| 670,382 | 3/1901 | Caldwell | 384/292 |
| 1,200,060 | 10/1916 | Wemp | 384/292 |
| 1,552,054 | 9/1925 | Green | 384/273 |
| 3,917,361 | 11/1975 | Murdoch . | |

Primary Examiner—Lenard A. Footland
Attorney, Agent, or Firm—Carl A. Rowold

[57] ABSTRACT

A friction bearing assembly for a roller cutter drill bit, comprising a first bearing member of cylindrical configuration and a second bearing member having an opening of generally circular section therein receiving the first member for enabling relative rotation of the members. A bushing is fitted between the bearing members, the bushing being of annular configuration and having an inner and an outer diameter so related to the diameter of the first bearing member and the diameter of the opening in the second bearing member as to enable the bushing to rotate relative to both members. The bushing is of width substantially greater than its thickness, and comprises a plurality of relatively thin, narrow elongate metal members, each metal member being of generally circular configuration and constituting a ring.

12 Claims, 5 Drawing Figures

U.S. Patent    Apr. 30, 1985    4,514,097
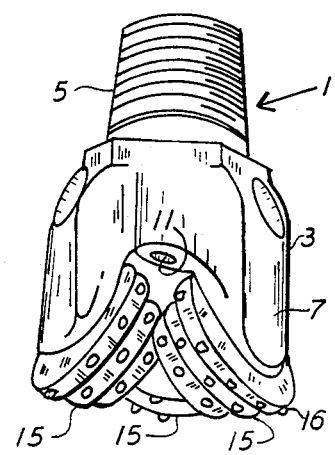
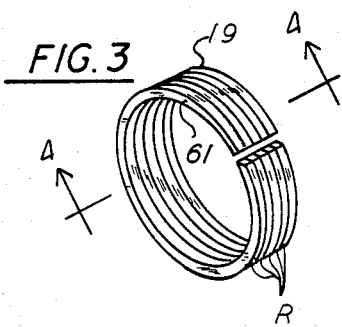
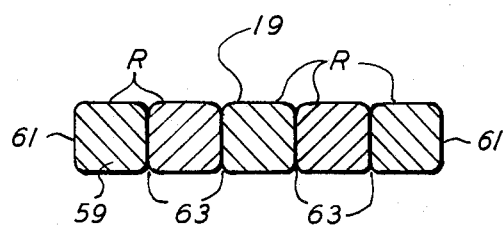
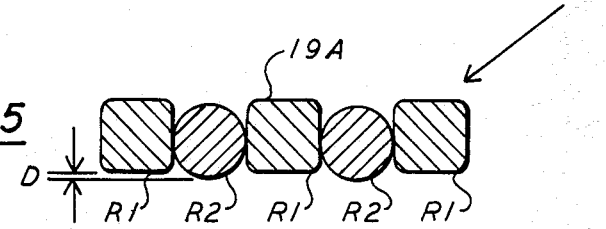

4,514,097

FRICTION BEARING ASSEMBLY HAVING A SERIES OF RINGS CONSTITUTING A BUSHING THEREFOR

BACKGROUND OF THE INVENTION

This invention relates to a bearing assembly, and more particularly to rotary friction bearing assembly for a roller cutter drill bit.

This invention involves an improvement over the rotary friction bearing assembly for roller cutter drill bits of the type disclosed in co-assigned U.S. Pat. No. 3,917,361, comprising a bearing journal, a roller cutter rotatably mounted on the bearing journal, and a so-called "floating" bushing between the bearing journal and roller cutter which is free to rotate relative to both the journal and the roller cutter. The bushing is of generally annular configuration and is split in the direction of its longitudinal axis to provide a gap enabling the bushing to accomodate thermal expansion of the bushing metal due to heating of the bearing assembly on use of the drill bit.

The engaging surfaces of the bearing members of this bearing assembly are machined to relatively close tolerances to reduce the amount of clearance or play in the bearing assembly. While a certain amount of clearance is needed for relative rotation of the bearing members, clearance in excess of this desired amount leads to shortened bearing life. Heretofore, the desired dimensional tolerance of the bushing could be obtained only by the relatively time-consuming and costly process of machining, as by turning down on a lathe, cylindrical or tubular metal stock and cutting the slit in the bushing after its machining.

Attempts to bend or wind a length of strip material of a thickness and width corresponding to that of the finished bushing around a mandrel to form the bushing proved to be unsuccessful. Because of the elastic deformation properties of the bushing metal, the strip material after being wound into a circular configuration exhibited a tendency to "spring open" (i.e., deviate from a circular configuration) at the gap between the opposing ends thereof. This resulted in these strip metal bushings being out-of-tolerance and thus unusable.

SUMMARY OF THE INVENTION

Among the several objects of this invention may be noted the provision of a rotary friction bearing assembly for a roller cutter drill bit which requires less machining than conventional bearing assemblies and thus is less costly to manufacture than these assemblies; the provision of such a bearing assembly which has increased load carrying capacity and longer life; the provision of such a bearing assembly which may be manufactured with smaller clearances between its bearing members; and the provision of such a bearing assembly which has bushing means which may be formed of different bearing materials and may be of different sectional shapes along its length for improved bearing lubrication and longer bearing life.

In general, the friction bearing assembly of this invention comprises a first bearing member of cylindrical configuration, and a second bearing member having an opening of generally circular section therein receiving the first member for relative rotation of the members. Bushing means of generally annular configuration is fitted between said members, the bushing means having an inner and an outer diameter so related to the diameter of the first bearing member and the diameter of the opening in the second bearing member as to enable the bushing means to rotate relative to the members. The bushing means further is of a width, as measured in the direction of its longitudinal axis, greater than its thickness, as measured along a radius thereof, so as to present relatively large bearing surfaces. The bushing means comprises a plurality of relatively thin, narrow elongate metal members, each metal member being of generally circular configuration and constituting a ring.

Other objects and features will be in part apparent and in part pointed out hereinafter.

BRIEF DESCRIPTION OF THE DRAWINGS

FIG. 1 is a side elevation of a drill bit comprising a bit body having three depending legs, a roller cutter on each leg, and a friction bearing assembly of a first embodiment of this invention for each roller cutter;

FIG. 2 is a partial vertical section of the bit through one leg showing a bearing journal on the leg and bushing means of the bearing assembly;

FIG. 3 is a perspective of the bushing means, as removed from the bearing journal; and FIG. 4 is an enlarged transverse section of the bushing means on line 4—4 of FIG. 3.

FIG. 5 is a view similar to FIG. 4 showing bushing means of a second embodiment of the bearing assembly.

Corresponding reference characters indicate corresponding parts throughout the several views of the drawings.

DESCRIPTION OF THE PREFERRED EMBODIMENT

Referring to FIG. 1, there is indicated at 1, a rotary earth boring drill bit of the type used to drill for oil. The bit comprises a bit body 3 having a threaded pin 5 at its upper end adapted to be detachably secured to drill pipe or the like (not shown) for rotating the bit, and three generally identical depending legs 7 at its lower end. The pin 5 has a recess or chamber 9 therein for receiving drilling fluid under pressure pumped down the passage of the drill pipe. Nozzles (one such nozzle being shown at 11 in FIG. 1) in fluid communication with the chamber 9 direct the drilling fluid against the bottom of the wellbore to clean it and carry away formation cuttings formed during the drilling operation. Each leg 7 of the bit body has an inwardly and downwardly extending generally cylindrical shaft or bearing journal 13 at its lower end. A generally conical roller cutter 15 having cutting elements 16 thereon is mounted for rotation on the bearing journal 13 of each leg of the bit by a friction bearing assembly 17 of this invention. As shown in FIG. 2 the bearing assembly 17 for each leg comprises the respective bearing journal 13 as a first bearing member, the respective roller cutter 15 as a second bearing member, and bushing means 19 between these bearing members.

To lubricate the bearing assembly 17, each leg 7 is provided with a lubrication system 21. This system comprises a lubricant reservoir 23 holding a supply of suitable lubricant 25, such as a petroleum based grease, a flexible diaphragm 27 forming one wall of the reservoir for equalizing the pressure of the grease in the system with that of the drilling fluid around the bit, and passaging 29 extending down from the reservoir along the leg 7 and the bearing journal 13 to the space between the roller cutter 15 and the journal 13. With the bit in use, the grease 25 flows from the reservoir 23, through the passaging 29, between the journal 13 and roller cutter 15 to the bearing assembly 17 to lubricate it. An annular seal member or so-called "radial seal" 31 on the roller cutter 15 sealingly engages the journal 13 to block entry of drilling fluid into the lubrication system and to reduce leakage of grease out of the system 21 past the bearing assembly 17.

Each bearing journal 13 has a first generally cylindrical portion 33 of relatively small diameter, constituting a bearing pin, at its inner (radially inner end with respect to the centerline of the bit) or free end and a second generally cylindrical portion 35 of relatively large diameter toward its radially outer end in axial alignment with the bearing pin 33. The outer portion 35 has a annular groove 37 therein at one end thereof, a relatively wide cylindrical surface 39 at the center thereof, and a cylindrical land 41 at its other end sealingly engageable by the seal element 31 on the roller cutter.

The roller cutter 15 has a recess 43 therein comprising an inner portion of circular section receiving the bearing pin 33 in rotary sliding engagement, and a larger outer portion, also of circular section, receiving the stated second portion 35 of the bearing journal. The outer portion of the recess has an annular groove 45 complementary to the groove 37 in the bearing journal and defining together with it ball races for balls 47 (two such balls 47 being shown in FIG. 2). The balls in the races hold the roller cutter 15 on the journal bearing 13 against radially inwardly directed loads tending to move the roller cutter down off the journal. They are inserted in the races through a ball hole 49 in the leg 7, which is closed after the balls are in place by a ball retaining plug 51 secured in the hole as by weldment 53. The outer portion of the recess 43 further has a cylindrical surface 55 complementary to the surface 39 of the journal and defining with it bushing races for bushing means 19, and an annular recess 57 at its outer end holding the seal member 31.

The bushing means 19 is annular configuration and is positioned in the bushing races in the bearing assembly. Its inner diameter is greater than the diameter of the bushing race surface 39 on the bearing journal and its outer diameter is less than the diameter of the bushing race surface 55 on the roller cutter, whereby the bushing means 19 is free to rotate relative to both the bearing journal and the roller cutter. The bushing means 19 further is of a width, as measured in the direction of its longitudinal axis, substantially greater than its thickness, as measured along a radius thereof, so as to present relatively large bearing surfaces at which the bushing means 19 engages the bearing journal 13 and the roller cutter 15. The freedom of the bushing means to rotate relative to both of the other bearing elements, and its relatively large bearing surfaces together serve to prolong the life of the bearing assembly 17, in that if the bushing means 19 due to galling seizes on one bearing member, it is free to rotate relative to the other bearing member, with either bearing surface of the bushing means being large enough to carry, by itself, the entire load on the bearing assembly 17.

As best illustrated in FIGS. 3 and 4, the bushing means 19 comprises a plurality of relatively thin, narrow elongate metal members, such as lengths of wire, with each length of wire 59 being wound into a circular configuration to form a split ring R (five such split rings R being illustrated in FIGS. 3 and 4) "having a single gap therein extending across the width thereof". The wire is of a suitable bearing metal such as an aluminum bronze or beryllium copper alloy, and is of generally rectangular (more particularly square with rounded corners) shape in section, although it is contemplated that wire of other sectional shapes, such as circular, could be used. Each ring R so formed presents end faces 61 which are generally smooth and flat, with the end faces of the endmost ring lying in radial planes of the bushing means and being engageable with shoulders on the roller cutter and the bearing journal defining the axial ends of the bushing races.

The rings R are also engageable with each other in side-by-side relation. The rounded corners of adjacent rings define annular grooves 63 of generally V section adapted to hold grease 25 for lubricating the bushing races. The bushing means 19 is slightly narrower than the bushing races and thus is free to move axially between the bearing journal 13 and roller cutter 15. As the bushing means moves axially, it wipes grease held in the V section grooves 63 over the bearing surfaces of the other bearing members to keep the bearing assembly lubricated.

The multiple split ring construction of the bushing means 19 enables the bushing means to flex circumferentially as does the conventional "split floating" bushing to accomodate for thermal expansion of the bushing means due to heating of the bearing assembly 17 on use of the bit 1. However, in contrast to the conventional bushing, the bushing means 19 also is extensible in its longitudinal axial direction and is flexible radially, thereby enabling it more closely to conform to the shape of the bushing races on the bearing journal 13 and the roller cutter 15, which are always (at least to some minor degree) out-of-round. This shape conformance increases the effective area of the load carrying surfaces of the bushing means 19, and further allows the bearing assembly to be made with smaller clearances between bearing elements for improved bearing load carrying capacity and longer life. The smaller bearing clearances also reduce the extent of radial travel of the roller cutter 15 relative to the bearing journal 13 at its outer end for increasing the life of the seal member 31.

In the manufacture of the bushing means 19, a suitable length of wire 59 of the desired width, thickness and dimensional tolerances is wound into a circle around a cylindrical mandrel (not shown) having a diameter corresponding to the desired inner diameter of the bushing means. With the wire so wound, the ring is removed from the mandrel, and is preferably plated with a thin coating, approximately 0.001 inch thick, of silver which has desireable anti-galling and lubricating properties. In assembling the bearing assembly 17, the rings are positioned in side-by-side relation in the roller cutter, and the roller cutter is then fitted on the bearing journal. Balls 47 are inserted in the ball races through the ball hole 49 to hold the roller cutter on the bearing journal, with the rings thus held in the bushing races.

While the elastic deformation properties of the metal of the wire 59 tends to cause the rings at opposing ends thereof to "spring open" from a circular configuration, the extent to which they open is significantly less than the extent to which a single strip of the same metal of a width corresponding to the overall width of the bushing means would open. Moreover, the ends of the ring are relatively flexible in a radial direction so that any deviation from a circular configuration of these ends will not interfere with the proper functioning of the bushing means in the bearing assembly.

It is contemplated that the rings R could be formed by cutting a helix formed by winding a wire 59 around a mandrel, along a line parallel to the longitudinal axis of the helix. The rings so formed would resemble lock washers in that the ends of each ring would be spaced from each other in the direction of the longitudinal axis of the ring. These lock washers could then be flattened to form relatively planar rings such as the rings R shown in FIG. 3. Alternatively, the lock washers could be left in their non-planar configuration, with the end rings of the bushing means being so trimmed as to present generally smooth, flat end faces lying in radial planes of the bushing means. This arrangement is considered to be particularly advantageous for bushing means comprising different bushing materials, as described more fully hereinafter, in that each ring engages a relatively wide annular area of the other bearing members on a relative rotation of the rings, so that alternating rings need not be in bearing engagement with bearing members in order for the bushing means to provide support to the other bearing members over the full width of the bushing means.

It is also contemplated that the rings could be cut from machined tubular or cylindrical bearing metal stock. However, due to the cost of machining the tubular stock to tolerance this approach is not preferred.

Referring now to FIG. 5, bushing means 19A of a second embodiment 17 of the bearing assembly of this invention is shown to comprise sets of rings, which are not the same as each other. As shown, the rings R1 of one set of rings (i.e., the endmost rings and the center ring of the bushing means) differ from the rings R2 of the set of remaining rings. The sets of rings differ from each other in their sectional shape (e.g., the rings R1 of one set are of generally square section and those of the other are generally round), in their inner and outer diameters, and in the material from which they are formed. By varying these characteristics, as well as, varying the number and relative position of the different rings, the bearing properties of the bushing means 19A readily can be varied to meet the requirements of the bearing assembly. For example, by varying the inner and outer diameters and the sectional shapes of the rings, the clearance between bearing surfaces of the bearing assembly, and the radial flexibility of the bushing means may be varied. Moreover, by forming certain rings from a material such as silver or cadium having anti-galling lubricant properties, the lubrication of the bushing means may be improved.

It will be observed from the above that the improved bearing assembly 17, 17A of this invention has increased load carrying capacity, and prolonged bearing member and seal member life as compared with conventional rotary friction bearing assemblies. Moreover, this bearing assembly may be manufactured with smaller bearing clearances, yet at a lower cost than conventional bearing assemblies.

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

What is claimed is:

1. A rotary drill bit comprising:

a bit body having at least one depending leg at its lower end, said leg having a generally cylindrical bearing journal at its lower end;

a roller cutter having a recess of generally circular section therein receiving the bearing journal for rotatably mounting the roller cutter on the bearing journal; and bushing means of generally annular configuration between the bearing journal and the roller cutter having an inner and an outer diameter so related to the diameter of the bearing journal and the diameter of the recess in the roller cutter as to enable the bushing means to rotate relative to both the bearing journal and the roller cutter, the bushing means further being of a width, as measured in the direction of its longitudinal axis, which is substantially greater than its thickness, as measured along a radius thereof, so as to present relatively large bearing surfaces, the bushing means comprising a plurality of relatively thin, narrow elongate metal members each formed (configured) into a circular (form) configuration and constituting a split ring having a single gap therein extending across the width thereof.

2. A drill bit as set forth in claim 1 wherein said metal member are of generally rectangular configuration in transverse section.

3. A drill bit as set forth in claim 2 wherein the shape of said metal members in section is generally square with rounded corners.

4. A drill bit as set forth in claim 1 wherein said rings are arranged in side-by-side relation, with the rings at the ends of the bushing means have end faces lying in radial planes of the bushing means.

5. A drill bit as set forth in claim 1 wherein at least two of said rings are of different material.

6. A drill bit as set forth in claim 1 wherein at least two of said rings have different inner diameters.

7. A drill bit as set forth in claim 1 wherein at least two of said rings have different shapes in transverse section.

8. A friction bearing assembly for a rotary drill bit comprising:

a first bearing member of cylindrical configuration;

a second bearing member having an opening of generally circular section therein receiving the first member for relative rotation of the members; and bushing means of generally annular configuration between the members having an inner and an outer diameter so related to the diameter of the first member and the diameter of the opening in the second member as to enable the bushing means to rotate relative to the members, the bushing means further being of a width, as measured in the direction of its longitudinal axis, substantially greater than its thickness, as measured along the radius thereof, so as to provide relatively large bearing surfaces, the bushing means comprising a plurality of relatively thin, narrow elongate metal members, each metal member being of generally circular configuration and constituting a split ring having a single gap therein extending across the width thereof, the elongate metal members being of aluminum bronze.

9. A friction bearing assembly for a rotary drill bit comprising:

a first bearing member of cylindrical configuration;

a second bearing member having an opening of generally circular section therein receiving the first member for relative rotation of the members; and bushing means of generally annular configuration between the members having an inner and an outer diameter so related to the diameter of the first member and the diameter of the opening in the second member as to enable the bushing means to rotate relative to the members, the bushing means further being of a width, as measured in the direction of its longitudinal axis, substantially greater than its thickness, as measured along the radius thereof, so as to provide relatively large bearing surfaces, the bushing means comprising a plurality of relatively thin, narrow elongate metal members, each metal member being of generally circular configuration and constituting a split ring having a single gap therein extending across the width thereof, the elongate metal members being of beryllium copper.

10. A friction bearing assembly for a rotary drill bit comprising:

a first bearing member of cylindrical configuration;

a second bearing member having an opening of generally circular section therein receiving the first member for relative rotation of the members; and bushing means of generally annular configuration between the members having an inner and an outer diameter so related to the diameter of the first member and the diameter of the opening in the second member as to enable the bushing means to rotate relative to the members, the bushing means further being of a width, as measured in the direction of its longitudinal axis, substantially greater than its thickness, as measured along the radius thereof, so as to provide relatively large bearing surfaces, the bushing means comprising a plurality of relatively thin, narrow elongate metal members, each metal member being of generally circular configuration and constituting a split ring having a single gap therein extending across the width thereof, at least two of said rings being of different material.

11. A friction bearing assembly for a rotary drill bit comprising:

a first bearing member of cylindrical configuration;

a second bearing member having an opening of generally circular section therein receiving the first member for relative rotation of the members; and bushing means of generally annular configuration between the members having an inner and an outer diameter so related to the diameter of the first member and the diameter of the opening in the second member as to enable the bushing means to rotate relative to the members, the bushing means further being of a width, as measured in the direction of its longitudinal axis, substantially greater than its thickness, as measured along the radius thereof, so as to provide relatively large bearing surfaces, the bushing means comprising a plurality of relatively thin, narrow elongate metal members, each metal member being of generally circular configuration and constituting a split ring having a single gap therein extending across the width thereof, at least two of said rings having different inner diameters.

12. A friction bearing assembly for a rotary drill bit comprising:

a first bearing member of cylindrical configuration;

a second bearing member having an opening of generally circular section therein receiving the first member for relative rotation of the members; and bushing means of generally annular configuration between the members having an inner and an outer diameter so related to the diameter of the first member and the diameter of the opening in the second member as to enable the bushing means to rotate relative to the members, the bushing means further being of a width, as measured in the direction of its longitudinal axis, substantially greater than its thickness, as measured along the radius thereof, so as to provide relatively large bearing surfaces, the bushing means comprising a plurality of relatively thin, narrow elongate metal members, each metal member being of generally circular configuration and constituting a split ring having a single gap therein extending across the width thereof, at least two of said rings being of different shapes in transverse section.

* * * * *